United States Patent [19]

Nakatsuji et al.

[11] Patent Number: 5,474,965
[45] Date of Patent: Dec. 12, 1995

[54] CATALYST FOR CATALYTIC REDUCTION OF NITROGEN OXIDE

[75] Inventors: Tadao Nakatsuji; Hiromitsu Shimizu; Ritsu Yasukawa, all of Osaka; Masaaki Kawatsuki; Mitsunori Tabata, both of Saitama; Hiroshi Tsuchida, Kanagawa; Yoshiaki Kintaichi; Motoi Sasaki, both of Ibaraki, all of Japan

[73] Assignees: Sakai Chemical Industry Co., Ltd., Osaka; Petroleum Energy Center, Tokyo; Cosmo Oil Co., Ltd., Tokyo; Agency of Industrial Science and Technology, Tokyo, all of Japan

[21] Appl. No.: 165,654

[22] Filed: Dec. 13, 1993

[30] Foreign Application Priority Data

Dec. 14, 1992 [JP] Japan ................................. 4-332757
Oct. 12, 1993 [JP] Japan ................................. 5-253970

[51] Int. Cl.[6] .......................... B01J 23/10; B01J 23/40; B01J 23/52
[52] U.S. Cl. .......................... 502/330; 502/303; 502/304; 502/333; 502/334; 502/339; 423/239.1
[58] Field of Search .......................... 502/303, 304, 502/330, 333, 334, 339; 423/239.1

[56] References Cited

U.S. PATENT DOCUMENTS

| | | | |
|---|---|---|---|
| 3,899,444 | 8/1975 | Stephens | 502/303 |
| 4,162,235 | 7/1979 | Acres et al. | 502/303 |
| 4,237,032 | 12/1980 | Evans et al. | 502/304 |
| 4,650,782 | 3/1987 | Onal | 502/339 |
| 4,839,327 | 6/1989 | Haruta et al. | 502/330 |
| 4,902,661 | 2/1990 | Immel et al. | 502/313 |

FOREIGN PATENT DOCUMENTS

| | | |
|---|---|---|
| 0107923 | 5/1984 | European Pat. Off. |
| 2344323 | 10/1977 | France. |
| 4008371 | 9/1990 | Germany. |
| 9209365 | 6/1992 | United Kingdom. |

*Primary Examiner*—Anthony McFarlane
*Attorney, Agent, or Firm*—Sughrue, Mion, Zinn, Macpeak & Seas

[57] ABSTRACT

A novel catalyst for catalytic reduction of nitrogen oxide using a hydrocarbon as a reducing agent is provided, which comprises (a) at least an element of the platinum group selected from the group consisting of platinum, iridium, rhodium and ruthenium and (b) gold, and which may further comprises (c) at least a metallic oxide selected from the group consisting of cerium oxide, lanthanum oxide, neodymium oxide, germanium oxide and gallium oxide.

20 Claims, No Drawings

CATALYST FOR CATALYTIC REDUCTION OF NITROGEN OXIDE

FIELD OF THE INVENTION

The present invention relates to a catalyst for catalytic reduction of nitrogen oxide. More particularly, it relates to a catalyst for catalytic reduction of nitrogen oxide which is suitable for reduction and removal of harmful nitrogen oxide contained in emissions from factories, automobiles, etc.

BACKGROUND OF THE INVENTION

Nitrogen oxide present in exhaust or emissions have been removed by, for example, a method in which the nitrogen oxide is further oxidized and then absorbed in an alkali or a method comprising reducing it to nitrogen by using ammonia, hydrogen, carbon monoxide, hydrocarbons, etc. as a reducing agent.

These conventional methods have their own disadvantages. That is, the former method requires a means for handling the alkaline waste liquid to prevent environmental pollution. Of the latter method, the method of using ammonia as a reducing agent involves the problem that ammonia reacts with sulfur oxides in the emissions to form salts, resulting in a reduction in catalyst activity. When in using hydrogen, carbon monoxide, or a hydrocarbon as a reducing agent, the reducing agent preferentially undergoes reaction with oxygen because oxygen is present in a higher concentration than nitrogen oxide in emission. This means that substantial reduction of nitrogen oxide requires a large quantity of the reducing agent.

It has recently been proposed to catalytically decomposing nitrogen oxide in the absence of a reducing agent. However, known catalysts for direct decomposition of nitrogen oxide have not yet been put to practical use due to their low decomposing activity.

On the other hand, H type zeolite, Cu ion-exchanged ZSM-5, etc. have also been proposed as a catalyst for catalytic reduction of nitrogen oxide using a hydrocarbon or an oxygen-containing organic compound as a reducing agent. In particular, H type ZSM-5 ($SiO_2/Al_2O_3$ molar ratio=30 to 40) are regarded optimal. However, even the H type ZSM-5 is not deemed to have sufficient reducing activity. In particular, when the emissions have some water content, the zeolite structure is dealuminated, showing a sudden drop in its performance. It has thus been demanded to develop a catalyst for catalytic reduction of nitrogen oxide which exhibits higher reduction activity and shows a high durability even if the emissions have some water content.

SUMMARY OF THE INVENTION

An object of the present invention is to provide a catalyst for catalytic reduction of nitrogen oxide using a hydrocarbon as a reducing agent, which selectively catalyzes a reaction of nitrogen oxide with the reducing agent even in the presence of oxygen and particularly in the presence of oxygen and water content so that nitrogen oxide in emissions can be reduced efficiently without requiring a large quantity of the reducing agent and a high durability can be provided even in the presence of water content.

The present invention provides a catalyst for catalytic reduction of nitrogen oxide using a hydrocarbon as a reducing agent, which comprises:

(a) at least an element of the platinum group selected from the group consisting of platinum, iridium, rhodium and ruthenium; and (b) gold in an amount of 0.01 to 10 parts by weight based on 100 parts by weight of the element of the platinum group.

The present invention further provides a catalyst for catalytic reduction of nitrogen oxide using a hydrocarbon as a reducing agent, which comprises:

(a) at least an element of the platinum group selected from the group consisting of platinum, iridium, rhodium and ruthenium;

(b) gold in an amount of 0.01 to 10 parts by weight based on 100 parts by weight of the element of the platinum group; and (c) at least a metallic oxide selected from the group consisting of cerium oxide ($CeO_2$), lanthanum oxide ($La_2O_3$), neodymium oxide ($Nd_2O_3$), germanium oxide ($GeO_2$) and gallium oxide ($Ga_2O_3$) in an amount of 100 to 100,000 parts by weight based on 100 parts by weight of the element of the platinum group.

DETAILED DESCRIPTION OF THE INVENTION

The catalyst for catalytic reduction of nitrogen oxide using a hydrocarbon as a reducing agent according to the present invention comprises active components as described above. In general, these active components are supported on an ordinary known carrier such as alumina, silica, silica-alumina, titania, zirconia and H type zeolite for use.

In general, various methods for supporting the catalytically active components on the carrier have been heretofore known. The catalyst according to the present invention should not be limited by these supporting methods. For example, dipping method, deposition method, ion-exchanging method or combination thereof may be used to support the active components on the carrier.

Nevertheless, the first embodiment of the catalyst according to the present invention can be obtained by supporting the foregoing elements of the platinum group preferably on a carrier such as alumina in a highly dispersed form by the ion-exchanging method, and then supporting gold thereon by the ion-exchanging method or in the form of high dispersion of colloidal gold hydroxide or the like.

The second embodiment of the catalyst according to the present invention can be obtained by supporting preferably the foregoing metallic oxide on the foregoing carrier by the dipping method or deposition method, supporting the elements of the platinum group thereon in a highly dispersed form by the ion-exchanging method, and then supporting gold thereon by the ion-exchanging method or in the form of high dispersion of colloidal gold hydroxide or the like.

Further, in the present invention, the catalyst thus obtained is preferably subjected to reduction with hydrogen or the like.

In accordance with the foregoing methods, the present invention can provide a catalyst for catalytic reduction of nitrogen oxide having a high activity and selectivity.

That is, in accordance with the foregoing method for preparing the first embodiment of the catalyst according to the present invention, platinum complex ions or ions of other elements of the platinum group undergo ion exchange with ion-exchangeable groups contained in the foregoing carrier such as alumina (e.g., hydrogen ion if the carrier is alumina or alkaline metal ion in most cases if the carrier is zeolite)

so that platinum or other elements of the platinum group as mentioned above are supported on the carrier in a highly dispersed form. Gold is then supported on the carrier in a highly dispersed form so that the oxidative effect of the elements of the platinum group in the catalyst can be properly adjusted. Thus, a catalyst for catalytic reduction of nitrogen oxide having a high activity and selectivity can be obtained.

In accordance with the foregoing method for preparing the second embodiment of the catalyst according to the present invention, ion-exchangeable groups contained in a previously prepared metallic oxide (hydroxyl groups in most cases) undergo ion exchange with at least one ion selected from the group consisting of platinum complex ion, iridium ion, rhodium ion and ruthenium ion so that the elements of the platinum group are supported on the metal oxide in a highly dispersed form. Assisted by a synergistic action of these elements of the platinum group and the foregoing metallic oxide, gold is then supported on the carrier in a highly dispersed form so that the oxidative effect of the elements of the platinum group in the catalyst can be properly adjusted. Thus, a catalyst for catalytic reduction of nitrogen oxide having a high activity and selectivity can be obtained.

In the first and second embodiments of the catalyst according to the present invention, the proportion of gold to elements of the platinum group is in the range of 0.01 to 10 parts by weight, preferably 0.05 to 5 parts by weight, more preferably 0.1 to 1 parts by weight, based on 100 parts by weight of elements of the platinum group. In the catalyst comprising elements of the platinum group and gold in such a proportion, the elements of the platinum group function as sites of activation by adsorption to hydrocarbon and nitrogen oxide and gold functions as a site of adjustment of adsorption by hydrocarbon so that the catalytic reaction proceeds selectively. Thus, it is considered that the catalyst according to the present invention exhibits a high activity and selectivity over a wide temperature range in a catalytic reduction reaction of nitrogen oxide using a hydrocarbon as a reducing agent.

Further, in the second embodiment of the catalyst according to the present invention, the proportion of metal oxide to elements of the platinum group is in the range of 100 to 100,000 parts by weight, preferably 500 to 10,000 parts by weight, more preferably 1,000 to 5,000 parts by weight, based on 100 parts by weight of elements of the platinum group. In the catalyst comprising elements of the platinum group and metallic oxide with gold in such a proportion, the elements of the platinum group and metallic oxide function as sites of activation by adsorption to hydrocarbon and/or nitrogen oxide and gold functions a site of adjustment of adsorption by hydrocarbon so that the catalytic reaction proceeds selectively. Thus, the catalyst according to the present invention exhibits a high activity and selectivity over a wide temperature range in a catalytic reduction reaction of nitrogen oxide using a hydrocarbon as a reducing agent.

In cases where the active components are supported on the foregoing carriers, the percent support of the catalyst according to the first embodiment is usually in the range of 0.1 to 10% by weight, the percent support of the catalyst according to the second embodiment is usually in the range of 1 to 50% by weight. The term "percent support" means the weight ratio (%) of (the weight of catalyst) to (the total weight of the carrier and the catalyst). In the catalysts according to the first and second embodiments, if the percent support of the active components of the respective catalysts is less than the respective lower limits, it cannot provide a sufficient catalytic activity for reduction of nitrogen oxide. On the other hand, if the percent support of the active components of the respective catalysts is more than the respective upper limits, it cannot increase the activity of the catalysts as expected. If necessary, however, the active components of the respective catalysts may be supported on the carrier in an amount that exceeds the respective upper limits.

The catalyst according to the present invention may be shaped into various shapes such as honeycomb, pellet and sphere by any of well known shaping methods. If desired, appropriate additives, such as shaping assistants, reinforcements, inorganic fibers, and organic binders, may be used on shaping. The catalyst may be coated on a previously molded base by, for example, a wash coat method. Any of known catalyst preparation techniques may be applied.

The hydrocarbons which can be used as a reducing agent in the present invention include gases such as hydrocarbon gas (e.g., methane, ethane, propane, propylene, butylene); and liquids such as unitary hydrocarbon (e.g., pentane, hexane, octane, heptane, benzene, toluene, xylene) and mineral oil hydrocarbon (e.g., gasoline, kerosine, gas oil, heavy oil). In the present invention, among these reducing agents, lower alkynes such as acetylene, methylacetylene and 1-butyne, lower alkenes such as ethylene, propylene, isobutylene, 1-butene and 2-butene, lower dienes such as butadiene and isoprene, and lower alkanes such as propane and butane are preferably used. These hydrocarbons may be used singly or in combination as necessary.

The amount of the hydrocarbon to be used as a reducing agent, though varying depending on its kind, is normally from 0.1 to 2 mols per mol of nitrogen oxide. If the hydrocarbon molar ratio falls below 0.1, sufficient reducing activity cannot be obtained with respect to nitrogen oxide. On the contrary, if the hydrocarbon molar ratio exceeds 2, the amount of the hydrocarbon which is withdrawn as being unreacted increases, requiring some post treatment for recovery of the unreacted hydrocarbon after the catalytic reduction of nitrogen oxide.

In addition, uncombusted matters or incomplete combustion products of fuels, etc. present in emissions, i.e., hydrocarbons and particulate matters, are also effective as a reducing agent and, accordingly, included in the term "hydrocarbons" as used herein. In other words, the catalyst of the present invention is deemed useful for removal or reduction of the hydrocarbons or particulate matters of emissions.

The temperature at which the above mentioned reducing agent selectively reduces nitrogen oxide ascends in the order of alkynes, alkenes, aromatic hydrocarbons, and alkanes. The greater the carbon atom number of hydrocarbons, the lower the effective temperature.

A suitable temperature for the catalyst of the present invention to show catalysis in reduction of nitrogen oxide usually ranges from 100° to 800° C., and preferably 200° to 500° C., though varying depending on the kind of the reducing agent or catalyst species used. Within the above recited temperature range, exhaust gas to be treated is preferably made to flow at a space velocity (SV) of from 500 to 100,000 hr$^{-1}$.

The present invention will be further described in the following examples, but the present invention should not be construed as being limited thereto.

EXAMPLE 1

In 50 ml of ion-exchanged water was dissolved 1.08 g of tetraammine platinum chloride (II) ($Pt(NH_3)_4Cl_2 \cdot H_2O$) to prepare an aqueous solution of $[Pt(NH_3)_4]^{2+}$ ions. The aqueous solution was then added to 200 ml of water containing 100 ml (60 g) of pellets of γ-alumina having a diameter of 3 mm (NK-324 available from Sumitomo Chemical Co., Ltd.) which had been previously dried at a temperature of 120° C. for 24 hours with thorough stirring so that $[Pt(NH_3)_4]^{2+}$ ions were exchanged with hydrogen ions present in the alumina. During this procedure, as the pH value lowered, a 0.2 wt % aqueous ammonia was added to the solution so that the pH value was kept to 5.5. This procedure continued until the amount of tetraammine platinum chloride (II) added to the water containing pellets of γ-alumina reached the predetermined value. The admixture was then stirred at a temperature of 70° C. for 2 hours.

The γ-alumina pellets which had thus hydrogen ions exchanged with $[Pt(NH_3)_4]^{2+}$ ions were filtered, washed with an aqueous solution of silver nitrate having a pH value of 5.5, dried at a temperature of 120° C. for 18 hours, and then calcined at a temperature of 500° C. for 4 hours to obtain γ-alumina having 1% by weight of platinum supported thereon.

On the other hand, to 100 ml of ion-exchanged water was added 4.76 ml of an aqueous solution of chloroauric acid (0.126 g/l as calculated in terms of gold). To the mixture was then added the platinum-supported γ-alumina with thorough stirring so that the γ-alumina was impregnated with the aqueous solution of chloroauric acid to have gold chloride ions supported on the γ-alumina by the ion-exchange method. The γ-alumina was filtered off, washed with ion-exchanged water, dried at a temperature of 120° C. for 18 hours, calcined at a temperature of 500° C. for 4 hours, and then subjected to reduction in a stream of a 4/1 (volumetric ratio) mixture of nitrogen and hydrogen at a temperature of 400° C. for 1 hour.

Thus, catalyst A-1 having 1% by weight of platinum and 0.001% by weight of gold supported on γ-alumina was obtained.

EXAMPLE 2

Catalyst A-2 having 1% by weight of platinum and 0.005% by weight of gold supported on γ-alumina was prepared in the same manner as in Example 1 except that the used amount of the aqueous solution of chloroauric acid (0.126 g/l as calculated in terms of gold) was 23.8 ml.

EXAMPLE 3

Catalyst A-3 having 1% by weight of platinum and 0.01% by weight of gold supported on γ-alumina was prepared in the same manner as in Example 1 except that an aqueous solution of chloroauric acid (1.26 g/l as calculated in terms of gold) was used in an amount of 4.76 ml.

EXAMPLE 4

Catalyst A-4 having 1% by weight of platinum and 0.05% by weight of gold supported on γ-alumina was prepared in the same manner as in Example 1 except that an aqueous solution of chloroauric acid (1.26 g/l as calculated in terms of gold) was used in an amount of 23.8 ml.

EXAMPLE 5

Catalyst A-5 having 1% by weight of platinum and 0.1% by weight of gold supported on γ-alumina was prepared in the same manner as in Example 1 except that an aqueous solution of chloroauric acid (1.26 g/l as calculated in terms of gold) was used in an amount of 47.6 ml.

EXAMPLE 6

Catalyst A-6 having 2% by weight of platinum and 0.005% by weight of gold supported on γ-alumina was prepared in the same manner as in Example 1 except that the used amount of tetraammine platinum chloride (II) $(Pt(NH_3)_4Cl_2 \cdot H_2O)$ was 2.16 g and the used amount of the aqueous solution of chloroauric acid (0.126 g/l as calculated in terms of gold) was 23.8 ml.

EXAMPLE 7

Catalyst A-7 having 5% by weight of platinum and 0.005% by weight of gold supported on γ-alumina was prepared in the same manner as in Example 1 except that the used amount of tetraammine platinum chloride (II) $(Pt(NH_3)_4Cl_2 \cdot H_2O)$ was 5.40 g and an aqueous solution of chloroauric acid (1.26 g/l as calculated in terms of gold) was used in an amount of 23.8 ml.

EXAMPLE 8

In 100 ml of ion-exchanged water was dissolved 28.5 g of cerium nitrate $(Ce(NO_3)_3 \cdot 6H_2O)$. Into the solution was put 100 ml (60 g) of pellets of γ-alumina having a diameter of 3 mm (NK-324 available from Sumitomo Chemical Co., Ltd.) which had been previously dried at a temperature of 120° C. for 24 hours. The admixture was then allowed to stand for 30 minutes so that the solution of cerium nitrate penetrated thoroughly into pores in the γ-alumina. The γ-alumina pellets were then withdrawn from the solution of cerium nitrate. The excess solution was then removed from the surface of the pellets. The γ-alumina pellets were then put into 200 ml of a 6 wt % aqueous ammonia. The admixture was then allowed to stand for 1 hour so that cerium nitrate in the pores in the γ-alumina was neutralized and hydrolyzed.

The γ-alumina pellets having cerium ions supported thereon were thoroughly washed with ion-exchanged water, and then calcined at a temperature of 500° C. for 3 hours to obtain γ-alumina pellets having cerium oxide supported thereon by a percent support of 10% by weight.

The γ-alumina pellets having cerium oxide supported thereon were then put into 250 ml of ion-exchanged water. The pH value of the admixture was 7.1. The pH value of the admixture was then adjusted with a 1/10 N nitric acid to 5.5.

Separately, in 50 ml of ion-exchanged water was dissolved 1.08 g of tetraammine platinum chloride (II) $(Pt(NH_3)_4Cl_2 \cdot H_2O)$ to prepare an aqueous solution of $[Pt(NH_3)_4]^{2+}$. The aqueous solution was then added to the aqueous solution of the γ-alumina having cerium oxide supported thereon with thorough stirring so that $[Pt(NH_3)_4]^{2+}$ ions were exchanged with hydrogen ions present in alumina or cerium oxide. During this procedure, as the pH value lowered, a 2 wt % aqueous ammonia was added to keep the pH value to 5.5. This procedure continued until the added amount of the aqueous solution of tetraammine platinum chloride (II) reached the predetermined value. The admixture was then stirred at a temperature of 70° C. for 2 hours.

The γ-alumina pellets which had thus cerium oxide supported thereon by the ion-exchanging method were filtered off, washed with an aqueous solution of nitric acid having a pH value of 5.5, dried at a temperature of 120° C. for 18 hours, and then calcined at a temperature of 500° C. for 4 hours to support 10% by weight of cerium oxide and 1% by weight of platinum on γ-alumina.

Further, catalyst A-8 having 10% by weight of cerium oxide, 1% by weight of platinum and 0.005% by weight of gold supported on γ-alumina was prepared by treating the foregoing γ-alumina in the same manner as in Example 1 except that the used amount of the aqueous solution of chloroauric acid (0.126 g/l as calculated in terms of gold) was 23.8 ml.

EXAMPLE 9

In 100 ml of ion-exchanged water was dissolved 57.0 g of cerium nitrate ($Ce(NO_3)_3 \cdot 6H_2O$). Into the solution was put 100 ml (60 g) of pellets of γ-alumina having a diameter of 3 mm (NK-324 available from Sumitomo Chemical Co., Ltd.) which had been previously dried at a temperature of 120° C. for 24 hours. The admixture was then allowed to stand for 30 minutes so that the solution of cerium nitrate penetrated thoroughly into pores in the γ-alumina. The γ-alumina pellets were then withdrawn from the solution of cerium nitrate. The excess solution was then removed from the surface of the pellets. The γ-alumina pellets were then put into 300 ml of a 6 wt % aqueous ammonia. The admixture was then allowed to stand for 1 hour so that cerium nitrate in the pores in the γ-alumina was neutralized and hydrolyzed.

The γ-alumina pellets having cerium ions supported thereon were thoroughly washed with ion-exchanged water, and then calcined at a temperature of 500° C. for 3 hours to obtain γ-alumina pellets having cerium oxide supported thereon by a percent support of 20% by weight.

The γ-alumina pellets having cerium oxide supported thereon were then put into 250 ml of ion-exchanged water. The pH value of the admixture was 7.1. The pH value of the admixture was then adjusted with a 1/10 N nitric acid to 5.5.

Separately, in 50 ml of ion-exchanged water was dissolved 1.08 g of tetraammine platinum chloride (II) ($Pt(NH_3)_4Cl_2 \cdot H_2O$) to prepare an aqueous solution of $[Pt(NH_3)_4]^{2+}$. The aqueous solution was then added to the aqueous solution of the γ-alumina having cerium oxide supported thereon with thorough stirring so that $[Pt(NH_3)_4]^{2+}$ ions were exchanged with hydrogen ions present in alumina or cerium oxide. During this procedure, as the pH value lowered, a 2 wt % aqueous ammonia was added to keep the pH value to 5.5. This procedure continued until the added amount of the aqueous solution of tetraammine platinum chloride (II) reached the predetermined value. The admixture was then stirred at a temperature of 70° C. for 2 hours.

Catalyst A-9 having 20% by weight of cerium oxide, 1% by weight of platinum and 0.005% by weight of gold supported on γ-alumina was prepared in the same manner as in Example 8.

EXAMPLE 10

In 100 ml of ion-exchanged water was dissolved 85.5 g of cerium nitrate ($Ce(NO_3)_3 \cdot 6H_2O$).

γ-Alumina pellets having cerium oxide supported thereon by a percent support of 30% by weight were then prepared by treating the solution in the same manner as in Example 8.

The γ-alumina pellets having cerium oxide supported thereon were then put into 250 ml of ion-exchanged water. The pH value of the admixture was 7.1. The pH value of the admixture was then adjusted with a 1/10 N nitric acid to 5.5.

Separately, in 50 ml of ion-exchanged water was dissolved 1.08 g of tetraammine platinum chloride (II) ($Pt(NH_3)_4Cl_2 \cdot H_2O$) to prepare an aqueous solution of $[Pt(NH_3)_4]^{2+}$. The aqueous solution was then added to the aqueous solution of the γ-alumina having cerium oxide supported thereon with thorough stirring so that $[Pt(NH_3)_4]^{2+}$ ions were exchanged with hydrogen ions present in alumina or cerium oxide. During this procedure, as the pH value lowered, a 2 wt % aqueous ammonia was added to keep the pH value to 5.5. This procedure continued until the added amount of the aqueous solution of tetraammine platinum chloride (II) reached the predetermined value. The admixture was then stirred at a temperature of 70° C. for 2 hours.

Catalyst A-10 having 30% by weight of cerium oxide, 1% by weight of platinum and 0.005% by weight of gold supported on γ-alumina was prepared in the same manner as in Example 1.

EXAMPLE 11

γ-Alumina pellets having cerium oxide supported thereon by a percent support of 30% by weight were then prepared in the same manner as in Example 8.

Separately, in 200 ml of ion-exchanged water was dissolved 4.32 g of tetraammine platinum chloride (II) ($Pt(NH_3)_4Cl_2 \cdot H_2O$) to prepare an aqueous solution of $[Pt(NH_3)_4]^{2+}$. The aqueous solution was then added to the aqueous solution of the γ-alumina having cerium oxide supported thereon with thorough stirring so that $[Pt(NH_3)_4]^{2+}$ ions were exchanged with hydrogen ions present in alumina or cerium oxide. During this procedure, as the pH value lowered, a 2 wt % aqueous ammonia was added to keep the pH value to 5.5. This procedure continued until the added amount of the aqueous solution of tetraammine platinum chloride (II) reached the predetermined value. The admixture was then stirred at a temperature of 70° C. for 2 hours.

30% by weight of cerium oxide and 4% by weight of platinum were then supported on the γ-alumina pellets in the same manner as in Example 8.

Catalyst A-11 having 30% by weight of cerium oxide, 4% by weight of platinum and 0.01% by weight of gold supported on γ-alumina was then prepared by treating the foregoing γ-alumina pellets in the same manner as in Example 1 except that the used amount of the aqueous solution of chloroauric acid (0,126 g/l as calculated in terms of gold) was 47.6 ml.

EXAMPLE 12

In 100 ml of ion-exchanged water was dissolved 47.8 g of lanthanum nitrate ($La(NO_3)_3 \cdot 6H_2O$).

γ-Alumina pellets having lanthanum oxide supported thereon by a percent support of 30% by weight were prepared by treating the solution in the same manner as in Example 8. These γ-alumina pellets were then put into 250 ml of ion-exchanged water. The admixture exhibited a pH value of 7.3. The pH value of the admixture was then adjusted with a 1/10 N nitric acid to 5.5.

Catalyst A-12 having 30% by weight of lanthanum oxide, 1% by weight of platinum and 0.005% by weight of gold was prepared by treating the foregoing γ-alumina pellets in the same as in Example 8.

EXAMPLE 13

In 100 ml of ion-exchanged water was dissolved 46.9 g of neodymium nitrate ($Nd(NO_3)_3 \cdot 6H_2O$).

γ-Alumina pellets having neodymium oxide supported thereon by a percent support of 30% by weight were prepared by treating the solution in the same manner as in Example 8. These γ-alumina pellets were then put into 250 ml of ion-exchanged water. The admixture exhibited a pH value of 7.5. The pH value of the admixture was then adjusted with a 1/10 N nitric acid to 5.5.

Catalyst A-13 having 30% by weight of neodymium oxide, 2% by weight of platinum and 0.005% by weight of gold was prepared by treating the foregoing γ-alumina pellets in the same as in Example 1.

EXAMPLE 14

γ-Alumina pellets having cerium oxide supported thereon by a percent support of 20% by weight were then prepared in the same manner as in Example 8.

The γ-alumina pellets having cerium oxide supported thereon were then put into 250 ml of ion-exchanged water. The pH value of the admixture was 7.1. The pH value of the admixture was then adjusted with a 1/10 N nitric acid to 5.5.

Separately, 2.46 g of ruthenium chloride ($RuCl_3$) was dissolved in a 0.1 N hydrochloric acid to prepare an aqueous solution of $Ru^{3+}$. The aqueous solution was then added to the aqueous solution of the γ-alumina having cerium oxide supported thereon with thorough stirring so that $Ru^{3+}$ ions were exchanged with hydrogen ions present in alumina or cerium oxide. During this procedure, as the pH value lowered, a 2 wt % aqueous ammonia was added to keep the pH value to 3.0. This procedure continued until the added amount of the aqueous solution of ruthenium chloride reached the predetermined value. The admixture was then stirred at a temperature of 70° C. for 2 hours.

20% by weight of cerium oxide and 2% by weight of ruthenium were then supported on the γ-alumina pellets in the same manner as in Example 8.

Catalyst A-14 having 20% by weight of cerium oxide, 2% by weight of ruthenium and 0.005% by weight of gold supported on γ-alumina was then prepared by treating the foregoing γ-alumina pellets in the same manner as in Example 1 except that the used amount of the aqueous solution of chloroauric acid (0.126 g/l as calculated in terms of gold) was 23.8 ml.

EXAMPLE 15

In 100 ml of ion-exchanged water was dissolved 59.6 g of gallium nitrate ($Ga(NO_3)_3 \cdot nH_2O$; 18.9% by weight as calculated in terms of Ga). Into the solution was put 100 ml (60 g) of pellets of γ-alumina having a diameter of 3 mm (NK-324 available from Sumitomo Chemical Co., Ltd.) which had been previously dried at a temperature of 120° C. for 24 hours. The admixture was then allowed to stand for 30 minutes so that the solution of gallium nitrate penetrated thoroughly into pores in the γ-alumina. The γ-alumina pellets were then withdrawn from the solution of gallium nitrate. The excess solution was then removed from the surface of the pellets. The γ-alumina pellets were then put into 200 ml of a 6 wt % aqueous ammonia. The admixture was then allowed to stand for 1 hour so that gallium nitrate in the pores in the γ-alumina was neutralized and hydrolyzed.

The γ-alumina pellets having gallium ions supported thereon were thoroughly washed with ion-exchanged water, and then calcined at a temperature of 500° C. for 3 hours to obtain γ-alumina pellets having gallium oxide supported thereon by a percent support of 10% by weight.

The γ-alumina pellets having gallium oxide supported thereon were then put into 250 ml of ion-exchanged water. The pH value of the admixture was 7.1. The pH value of the admixture was then adjusted with a 1/10 N nitric acid to 5.5.

Separately, in 50 ml of ion-exchanged water was dissolved 1.08 g of tetraammine platinum chloride (II) ($Pt(NH_3)_4Cl_2 \cdot H_2O$) to prepare an aqueous solution of $[Pt(NH_3)_4]^{2+}$. The aqueous solution was then added to the aqueous solution of the γ-alumina having gallium oxide supported thereon with thorough stirring so that $[Pt(NH_3)_4]^{2+}$ ions were exchanged with hydrogen ions present in alumina or gallium oxide. During this procedure, as the pH value lowered, a 2 wt % aqueous ammonia was added to keep the pH value to 5.5. This procedure continued until the added amount of the aqueous solution of tetraammine platinum chloride (II) reached the predetermined value. The admixture was then stirred at a temperature of 70° C. for 2 hours.

The γ-alumina pellets which had thus gallium oxide supported thereon by the ion-exchanging method were filtered off, washed with an aqueous solution of nitric acid having a pH value of 5.5, dried at a temperature of 120° C. for 18 hours, and then calcined at a temperature of 500° C. for 4 hours to support 10% by weight of gallium oxide and 1% by weight of platinum on γ-alumina.

Further, catalyst A-15 having 10% by weight of gallium oxide, 1% by weight of platinum and 0.005% by weight of gold supported on γ-alumina was prepared by treating the foregoing γ-alumina in the same manner as in Example 1 except that the used amount of the aqueous solution of chloroauric acid (0.126 g/l as calculated in terms of gold) was 23.8 ml.

EXAMPLE 16

In 105 ml of ethanol was dissolved 50.0 g of germanium tetrachloride ($GeCl_4$). Into the solution was put 100 ml (60 g) of pellets of γ-alumina having a diameter of 3 mm (NK-324 available from Sumitomo Chemical Co., Ltd.) which had been previously dried at a temperature of 120° C. for 24 hours. The admixture was then allowed to stand in a drying desiccator for 30 minutes so that the solution of germanium tetrachloride penetrated thoroughly into pores in the γ-alumina.

γ-Alumina pellets having germanium oxide supported thereon by a percent support of 20 % by weight were prepared by treating the γ-alumina pellets in the same manner as in Example 8.

The γ-alumina pellets having germanium oxide supported thereon were put into 250 ml of ion-exchanged water. The pH value of the admixture was 7.1. The pH value of the admixture was then adjusted with a 1/10 N nitric acid to 5.5.

Separately, in 50 ml of ion-exchanged water was dissolved 1.08 g of tetraammine platinum chloride (II) ($Pt(NH_3)_4Cl_2 \cdot H_2O$) to prepare an aqueous solution of $[Pt(NH_3)_4]^{2+}$. The aqueous solution was then added to the aqueous solution of the γ-alumina having germanium oxide supported thereon with thorough stirring so that $[Pt(NH_3)_4]^{2+}$ ions were exchanged with hydrogen ions present in alumina or germanium oxide. During this procedure, as the pH value lowered, a 2 wt % aqueous ammonia was added to keep the pH value to 5.5. This procedure continued until the added amount of the aqueous solution of tetraammine platinum chloride (II) reached the predetermined value. The admixture was then stirred at a temperature of 70° C. for 2 hours.

20% by weight of germanium oxide and 1% by weight of platinum were then supported on the γ-alumina pellets by treating the γ-alumina pellets in the same manner as in Example 1.

Further, catalyst A-16 having 20% by weight of germanium oxide, 1% by weight of platinum and 0.005% by weight of gold supported on γ-alumina was prepared by treating the foregoing γ-alumina in the same manner as in Example 1 except that the used amount of the aqueous solution of chloroauric acid (0.126 g/l as calculated in terms of gold) was 23.8 ml.

EXAMPLE 17

98 g of γ-alumina pellets having lanthanum oxide supported thereon was prepared in the same manner as in Example 8.

In 50 ml of ion-exchanged water was dissolved 5.37 g of rhodium chloride ($RhCl_3 \cdot nH_2O$; 37.24% by weight as calculated in terms of Rh) to prepare an aqueous solution of $Rh^{3+}$. The aqueous solution was then added to the aqueous solution of the γ-alumina having lanthanum oxide supported thereon with thorough stirring so that $Rh^{3+}$ ions were exchanged with hydrogen ions present in alumina or lanthanum oxide. During this procedure, as the pH value lowered, a 2 wt % aqueous ammonia was added to keep the pH value to 5.5. This procedure continued until the added amount of the aqueous solution of rhodium chloride reached the predetermined value. The admixture was then stirred at a temperature of 70° C. for 2 hours.

30% by weight of lanthanum oxide and 2% by weight of rhodium were then supported on the γ-alumina pellets in the same manner as in Example 8.

Catalyst A-17 having 30% by weight of lanthanum oxide, 2% by weight of rhodium and 0.005% by weight of gold supported on γ-alumina was then prepared by treating the foregoing γ-alumina pellets in the same manner as in Example 8.

EXAMPLE 18

In 100 ml of ion-exchanged water was dissolved 11.81 g of gallium nitrate ($Ga(NO_3)_3 \cdot nH_2O$; 18.9% by weight as calculated in terms of Ga).

The aqueous solution of gallium nitrate was added to a slurry of 100 ml of pellets of H-Mordenite having a diameter of 3 mm (HM-23 available from Nippon Chemical Industrial Co., Ltd.) which had been adjusted to a temperature of 70° C. and a pH value of 2.5 with thorough stirring so that ion exchanging was effected. During this procedure, as the pH value lowered, a 2 wt % aqueous ammonia was added to keep the pH value to 2.5. The procedure continued until the used amount of the aqueous solution of gallium nitrate reached the predetermined value. The admixture was then stirred for 2 hours.

The gallium ion-exchanged mordenite thus obtained was washed with ion-exchanged water, dried at a temperature of 120° C. for 18 hours, and then calcined at a temperature of 700° C. for 5 hours. Thus, mordenite pellets having 5% by weight of gallium ions supported thereon were obtained.

Separately, in 100 mℓ of ion-exchanged water of 80° C. was dissolved 5.32 g of iridium chloride ($IrCl_4$; 98.9% by weight as calculated in terms of iridium chloride). To the solution was then added the foregoing mordenite pellets. The admixture was then allowed to stand for 30 minutes so that the solution thoroughly penetrated into pores in the mordenite. The mordenite pellets were then withdrawn from the solution. The excess solution was then removed from the surface of the pellets. The mordenite pellets were subjected to reduction with 10% by weight of hydrazine, and then dried at a temperature of 120° C. for 18 hours. The mordenite pellets were then calcined at a temperature of 500° C. for 3 hours to obtain gallium ion-exchanged mordenite pellets having 2% by weight of iridium supported thereon.

Catalyst A-18 having 2% by weight of iridium and 0.005% by weight of gold supported on gallium ion-exchanged mordenite was then prepared in the same manner as in Example 8.

EXAMPLE 19

In 100 ml of ion-exchanged water was dissolved 1.61 g of chloroplatinic acid ($H_2PtCl_6 \cdot 6H_2O$) and 4.76 ml of an aqueous solution of chloroauric acid (0.126 g/l as calculated in terms of gold) to obtain an aqueous solution of chloroplatinic acid and chloroauric ion. To the solution, was added 60 g of H-ZSM-5 (EX-122 available from Mizusawa Kagaku Kogyo K.K., $SiO_2/Al_2O_3$ molar ratio=30) with stirring. Then, the resulting solution was allowed to stand for 30 minutes.

The slurry thus obtained was dried in a spray drier, and then calcined at a temperature of 500° C. for 4 hours to obtain catalyst A-19 having 1% by weight of platinum and 0.01% by weight of gold supported on H-ZSM-5.

COMPARATIVE EXAMPLE 1

A sodium type ZSM-5 available from Nippon Mobile K.K. ($SiO_2/Al_2O_3$ molar ratio=34) was hydrogenated to prepare an H type ZSM-5. The H type ZSM-5 thus obtained was shaped into spheres of a diameter of 2.4 mm with a silica sol (Snowtex N available from Nissan Chemical Industries, Ltd.) as a binder. The material was dried at a temperature of 120° C. for 18 hours, and then calcined at a temperature of 500° C. for 4 hours to obtain catalyst B-1.

COMPARATIVE EXAMPLE 2

1.59 g of chloroplatinic acid ($H_2PtCl_6 \cdot 6H_2O$) was dissolved in 100 ml of ion-exchanged water. Into the solution was put 100 ml of the same γ-alumina as used in Example 1. The admixture was then allowed to stand for 1 hour. The excess solution was removed from the γ-alumina. The γ-alumina was dried at a temperature of 120° C. for 18 hours, calcined at a temperature of 500° C. for 4 hours, and then subjected to reduction in a stream of a 4/1 mixture of nitrogen and hydrogen at a temperature of 400° C. for 1 hour.

Thus, catalyst B-2 having 1% by weight of platinum supported on γ-alumina was obtained.

COMPARATIVE EXAMPLE 3

In 100 ml of ion-exchanged water was dissolved 28.5 g of cerium nitrate ($Ce(NO_3)_3 \cdot 6H_2O$). Into the solution was put 100 ml (60 g) of pellets of γ-alumina having a diameter of 3 mm (NK-324 available from Sumitomo Chemical Co., Ltd.) which had been previously dried at a temperature of 120° C. for 24 hours. The admixture was then allowed to stand for 30 minutes so that the solution of cerium nitrate penetrated thoroughly into pores in the γ-alumina. The γ-alumina pellets were then withdrawn from the solution of cerium nitrate. The excess solution was then removed from the surface of the pellets. The γ-alumina pellets were then put into 200 ml of a 6 wt % aqueous ammonia. The admixture was then allowed to stand for 1 hour so that cerium nitrate in the pores in the γ-alumina was neutralized and hydrolyzed.

The γ-alumina pellets having cerium ions supported thereon were thoroughly washed with ion-exchanged water, and then calcined at a temperature of 500° C. for 3 hours to obtain γ-alumina pellets having cerium oxide supported thereon by a percent support of 10% by weight.

The γ-alumina pellets having cerium oxide supported thereon were then put into 250 ml of ion-exchanged water. The pH value of the admixture was 7.1. The pH value of the admixture was then adjusted with a 1/10 N nitric acid to 5.5.

Separately, in 50 ml of ion-exchanged water was dissolved 1.08 g of tetraammine platinum chloride (II) $(Pt(NH_3)_4Cl_2 \cdot H_2O)$ to prepare an aqueous solution of $[Pt(NH_3)_4]^{2+}$. The aqueous solution was then added to the aqueous solution of the γ-alumina having cerium oxide supported thereon with thorough stirring so that $[Pt(NH_3)_4]^{2+}$ ions were exchanged with hydrogen ions present in alumina or cerium oxide. During this procedure, as the pH value lowered, a 2 wt % aqueous ammonia was added to keep the pH value to 5.5. This procedure continued until the added amount of the aqueous solution of tetraammine platinum chloride (II) reached the predetermined value. The admixture was then stirred at a temperature of 70° C. for 2 hours.

The γ-alumina pellets which had thus cerium oxide supported thereon by the ion-exchanging method were filtered off, washed with an aqueous solution of nitric acid having a pH value of 5.5, dried at a temperature of 120° C. for 18 hours, calcined at a temperature of 500° C. for 4 hours, and then subjected to reduction in a 4/1 mixture (volumetric ratio) of nitrogen and hydrogen at a temperature of 400° C. for 1 hour to support 10% by weight of cerium oxide and 1% by weight of platinum on γ-alumina. Thus, catalyst B-3 was obtained.

EVALUATION TEST

The foregoing catalyst specimens according to the present invention (A-1 to A-19) and comparative catalyst specimens (B-1 to B-3) were used to subject a nitrogen oxide-containing gas to catalytic reduction of nitrogen oxide under the following conditions. The percent nitrogen oxide removal was determined by the chemical luminescence method.

(Test Conditions)

(1) Gas Composition: NO: 500 ppm
   O2: 10% by volume
   Reducing agent: 500 ppm
   Water: 6% by volume
   Nitrogen: balance
(2) Space Velocity: 10,000 or 20,000 $hr^{-1}$
(3) Reaction Temperature: 200° C., 250° C., 300° C., 350° C., 400° C.

The results are set forth in Table 1.

TABLE 1

| Catalyst | Reducing Agent | SV (× $10^4$) ($Hr^{-1}$) | Nitrogen Oxide Removal (%) | | | | | |
|---|---|---|---|---|---|---|---|---|
| | | | 200° C. | 250° C. | 300° C. | 350° C. | 400° C. | 450° C. |
| A-1 | Propylene | 1 | 30.9 | 40.4 | 53.1 | 56.2 | 41.8 | 33.8 |
| A-2 | Propylene | 1 | 39.0 | 42.9 | 59.0 | 58.6 | 53.4 | 38.1 |
| A-3 | Propylene | 1 | 32.0 | 32.3 | 45.5 | 34.1 | 30.5 | 23.2 |
| A-4 | Propylene | 1 | 22.7 | 37.4 | 41.8 | 38.2 | 25.0 | 16.4 |
| A-5 | Propylene | 1 | 30.9 | 43.2 | 36.5 | 30.3 | 24.2 | 10.4 |
| A-6 | Propylene | 1 | 42.8 | 47.7 | 68.2 | 62.9 | 53.6 | 47.2 |
| A-7 | Propylene | 1 | 47.3 | 59.2 | 69.7 | 66.0 | 40.7 | 38.3 |
| A-8 | Propylene | 1 | 52.9 | 65.9 | 69.4 | 68.6 | 55.8 | 41.2 |
| A-9 | Propylene | 1 | 60.4 | 73.4 | 74.1 | 70.3 | 62.8 | 45.0 |
| A-10 | Propylene | 1 | 72.7 | 83.1 | 87.3 | 82.6 | 68.9 | 56.4 |
| | Propylene | 2 | 69.1 | 70.7 | 78.4 | 77.2 | 65.7 | 52.9 |
| | Propane | 1 | 61.1 | 74.2 | 80.5 | 81.1 | 73.6 | 63.3 |
| A-11 | Ethylene | 1 | 73.4 | 79.4 | 71.8 | 62.4 | 61.0 | 55.6 |
| | Propylene | 1 | 77.7 | 86.4 | 92.3 | 87.9 | 78.3 | 69.1 |
| | Propylene | 2 | 71.4 | 80.6 | 87.4 | 81.6 | 72.7 | 63.4 |
| | Propane | 1 | 70.3 | 79.6 | 85.2 | 88.3 | 81.8 | 72.5 |
| A-12 | Propylene | 1 | 46.1 | 52.8 | 62.1 | 72.9 | 63.2 | 40.6 |
| A-13 | Propylene | 1 | 44.5 | 50.3 | 64.0 | 65.2 | 63.1 | 45.4 |
| A-14 | Propylene | 1 | 0.0 | 0.0 | 61.7 | 70.2 | 75.8 | 64.9 |
| A-15 | Propylene | 1 | 42.6 | 57.0 | 75.3 | 71.4 | 68.0 | 54.6 |
| A-16 | Propylene | 1 | 52.8 | 60.9 | 77.5 | 83.8 | 79.0 | 59.7 |
| A-17 | Propylene | 1 | 0.0 | 0.0 | 59.5 | 62.3 | 72.0 | 69.9 |
| A-18 | Propylene | 1 | 0.0 | 0.0 | 36.5 | 52.7 | 51.4 | 43.1 |
| A-19 | Propylene | 1 | 42.5 | 45.3 | 36.2 | 27.3 | 10.1 | 7.6 |
| B-1 | Propylene | 1 | 3.8 | 11.0 | 20.4 | 27.5 | 29.5 | 23.2 |
| B-2 | Propylene | 1 | 9.5 | 24.7 | 20.3 | 16.5 | 17.0 | 0.5 |
| B-3 | Propylene | 1 | 42.6 | 40.9 | 41.1 | 46.6 | 20.3 | 5.1 |

The results set forth in Tables 1 and 2 show that the catalysts according to the present invention all provide a high percent nitrogen oxide removal while the comparative catalysts exhibit a low percent nitrogen oxide removal as a whole.

As mentioned above, the catalyst for catalytic reduction of nitrogen oxide according to the present invention can provide an efficient catalytic reduction of nitrogen oxide present in emissions using a hydrocarbon as a reducing agent over an extended range of temperature even in the presence of oxygen and water content and exhibit a high durability.

While the invention has been described in detail and with reference to specific embodiments thereof, it will be apparent to one skilled in the art that various changes and modifications can be made therein without departing from the spirit and scope thereof.

What is claimed is:

1. A catalyst for catalytic reduction of nitrogen oxide using a hydrocarbon as a reducing agent, which comprises:
   (a) at least one element of the platinum group selected from the group consisting of platinum, iridium, rhodium and ruthenium; and
   (b) gold in an amount of 0.01 to 10 parts by weight based on 100 parts by weight of the at least one element of the platinum group.

2. The catalyst for catalytic reduction of nitrogen oxide according to claim 1, wherein the catalyst is supported on a carrier in an amount of 0.1 to 10 wt % by percent support.

3. A catalyst for catalytic reduction of nitrogen oxide using a hydrocarbon as a reducing agent, which comprises:
   (a) at least one element of the platinum group selected from the group consisting of platinum, iridium, rhodium and ruthenium;
   (b) gold in an amount of 0.1 to 10 parts by weight based on 100 parts by weight of the at least one element of the platinum group; and
   (c) at least one metallic oxide selected from the group consisting of cerium oxide, lanthanum oxide, neodymium oxide, germanium oxide and gallium oxide in an amount of 100 to 100,000 parts by weight based on 100 parts by weight of the at least one element of the platinum group.

4. The catalyst for catalytic reduction of nitrogen oxide according to claim 3, wherein the catalyst is supported on a carrier in an amount of 1 to 50 wt % by percent support.

5. The catalyst for catalytic reduction of nitrogen oxide according to claim 1, wherein the catalyst comprises gold, rhodium, and platinum.

6. The catalyst for catalytic reduction of nitrogen oxide according to claim 1, wherein the at least one element of the platinum group is selected from the group consisting of iridium, rhodium and ruthenium.

7. The catalyst for catalytic reduction of nitrogen oxide according to claim 1, wherein the gold is present in an amount of 0.1 to 1 part by weight per 100 parts by weight of the at least one element of the platinum group.

8. The catalyst for catalytic reduction of nitrogen oxide according to claim 5, wherein the gold is present in an amount of 0.1 to 1 part by weight per 100 parts by weight of the at least one element of the platinum group.

9. The catalyst for catalytic reduction of nitrogen oxide according to claim 2, wherein the catalyst comprises gold, rhodium, and platinum.

10. The catalyst for catalytic reduction of nitrogen oxide according to claim 2, wherein the at least one element of the platinum group is selected from the group consisting of iridium, rhodium and ruthenium.

11. The catalyst for catalytic reduction of nitrogen oxide according to claim 2, wherein the gold is present in an amount of 0.1 to 1 part by weight per 100 parts by weight of the at least one element of the platinum group.

12. The catalyst for catalytic reduction of nitrogen oxide according to claim 9, wherein the gold is present in an amount of 0.1 to 1 part by weight per 100 parts by weight of the at least one element of the platinum group.

13. The catalyst for catalytic reduction of nitrogen oxide according to claim 3, wherein the catalyst comprises gold, rhodium, and platinum.

14. The catalyst for catalytic reduction of nitrogen oxide according to claim 3, wherein the at least one element of the platinum group is selected from the group consisting of iridium, rhodium and ruthenium.

15. The catalyst for catalytic reduction of nitrogen oxide according to claim 3, wherein the gold is present in an amount of 0.1 to 1 part by weight per 100 parts by weight of the at least one element of the platinum group.

16. The catalyst for catalytic reduction of nitrogen oxide according to claim 13, wherein the gold is present in an amount of 0.1 to 1 part by weight per 100 parts by weight of the at least one element of the platinum group.

17. The catalyst for catalytic reduction of nitrogen oxide according to claim 4, wherein the catalyst comprises gold, rhodium, and platinum.

18. The catalyst for catalytic reduction of nitrogen oxide according to claim 4, wherein the at least one element of the platinum group is selected from the group consisting of iridium, rhodium and ruthenium.

19. The catalyst for catalytic reduction of nitrogen oxide according to claim 4, wherein the gold is present in an amount of 0.1 to 1 part by weight per 100 parts by weight of the at least one element of the platinum group.

20. The catalyst for catalytic reduction of nitrogen oxide according to claim 17, wherein the gold is present in an amount of 0.1 to 1 part by weight per 100 parts by weight of the at least one element of the platinum group.

* * * * *